US006976213B1

United States Patent
Letourneau et al.

(10) Patent No.: US 6,976,213 B1
(45) Date of Patent: Dec. 13, 2005

(54) METHOD OF AUTOMATICALLY GENERATING SPECIFICATIONS AND PROVIDING ONLINE SERVICES FOR SAME

(75) Inventors: Gilles L. Letourneau, S. Portland, ME (US); Michael F. Brennan, Falmouth, ME (US)

(73) Assignee: InterSpec, Inc., Portland, ME (US)

( * ) Notice: Subject to any disclaimer, the term of this patent is extended or adjusted under 35 U.S.C. 154(b) by 983 days.

(21) Appl. No.: 09/709,368

(22) Filed: Nov. 10, 2000

(51) Int. Cl.[7] .......................... G06F 15/00; G06F 17/21
(52) U.S. Cl. ...................... 715/530; 715/502; 715/514; 707/6; 707/7
(58) Field of Search ........................ 715/502, 514, 715/530; 345/964; 706/919; 700/97; 707/6, 707/7, 102

(56) References Cited

U.S. PATENT DOCUMENTS

| 5,341,469 A | * | 8/1994 | Rossberg et al. | ............ 715/514 |
| 6,581,040 B1 | * | 6/2003 | Wright et al. | .................. 705/8 |
| 6,664,972 B2 | * | 12/2003 | Eichel et al. | ............... 345/582 |

* cited by examiner

Primary Examiner—Sanjiv Shah
Assistant Examiner—Almari Yuan
(74) Attorney, Agent, or Firm—Patricia M. Mathers; Thomas L. Bohan

(57) ABSTRACT

Method of automatically generating a construction specification that is immediately viewable and editable in real time, online. Construction project information can be automatically extracted from a CAD drawing or from a checklist that is filled out online, and a project specification based on a standardized base document automatically generated.

15 Claims, 8 Drawing Sheets

STANDARD BASE DOCUMENT
Division List

01 GENERAL DATA
   SECTION 01010 - SUMMARY OF WORK

SECTION 01400 - QUALITY CONTROL

SECTION 01600 - MATERIALS AND EQUIPMENT

02 SITEWORK
   SECTION 02080 - UTILITY MATERIALS

SECTION 02780 - UNIT PAVERS
   PART 1 GENERAL
   1.1 Related Documents
       A. Drawing and general provisions ...
   1.2 Summary
       A. This section includes ...
           1. Brick pavers set in aggregate setting bed
           2. Concrete pavers set in aggregate setting bed
           3. Brick pavers set in bituminous setting bed
           4. Asphalt block pavers set in bituminous setting bed
           5. Brick pavers set in mortar setting bed
           6. Rough stone pavers set in mortar setting bed
           7. Edge restraints for unit pavers
   1.3 Submittals
   1.4 Quality Assurance
   1.5 Delivery, Storage, and Handling
   1.6 Project Condition

03 CONCRETE
   SECTION 03300 - CAST-IN-PLACE CONCRETE

04 MASONRY
   SECTION 04410 - STONE MASONRY VENEER

05 METALS
   SECTION 05120 - STRUCTURAL STEEL

06 WOOD & PLASTICS
   SECTION 06100 - ROUGH CARPENTRY

07 THERMAL & MOISTURE PROTECTION
   SECTION 07210 - BUILDING INSULATION

08 DOORS & WINDOWS
   SECTION 08110 - STEEL DOORS AND FRAMES

09 FINISHES
   SECTION 09210 - GYPSUM PLASTER

10 SPECIALTIES
   SECTION 10100 - VISUAL DISPLAY BOARDS

11 EQUIPMENT
   SECTION 11460 - UNIT KITCHENS

12 FURNISHINGS
   SECTION 12494 - ROLLER SHADES

13 SPECIAL CONTRUCTION
   SECTION 13038 - SAUNAS

14 CONVEYING SYSTEMS
   SECTION 14310 - ESCALATORS

15 MECHANICAL SYSTEMS

16 ELECTRICAL SYSTEMS

FIG. 2

| MAPPINGS TABLE ||||
|---|---|---|---|
| MAP-ID | TAG-ID | SECTION-ID | PARAGRAPH-ID |
| 1000 | 221 | 02780 | 1 |
| 1001 | 221 | 02780 | 2 |
| 1002 | 221 | 02780 | 3 |
| 1003 | 221 | 02780 | 4 |
| 1004 | 600 | 02780 | 7 |
| 1005 | 603 | 02780 | 8 |
| 1006 | 601 | 02780 | 9 |
| 1007 | 604 | 02780 | 10 |
| 1008 | 602 | 02780 | 11 |
| 1009 | 605 | 02780 | 12 |
| 1010 | 221 | 02780 | 13 |
| 1011 | 553 | 02780 | 16 |
| 1012 | 554 | 02780 | 17 |
| 1013 | 555 | 02780 | 18 |
| 1014 | 556 | 02780 | 19 |
| 1015 | 601 | 02780 | 20 |

FIG. 4B

| SYSTEM TAGS TABLE |||
|---|---|---|
| TAG-ID | TAG | PARENT-ID |
| 221 | Unit Pavers | 0 |
| 553 | Brick Pavers | 221 |
| 554 | Concrete Pavers | 221 |
| 555 | Asphalt Pavers | 221 |
| 556 | Stone Pavers | 221 |
| 600 | Sand Aggregate | 553 |
| 601 | Bituminous | 553 |
| 602 | Mortar | 553 |
| 603 | Sand Aggregate | 554 |
| 604 | Bituminous | 555 |
| 605 | Mortar | 556 |

FIG. 4A

|  |  |  |  | PARAGRAPH-ID |
|---|---|---|---|---|
| 02 | SITEWORK | | | 1 |
| | SECTION 02780 - UNIT PAVERS | | | 1 |
| | PART 1 GENERAL | | | 2 |
| | 1.1 | Related Documents | | 3 |
| | | A. Drawing and general provisions ... | | 4 |
| | 1.2 | Summary 5 | | |
| | | A. This section includes ... | | 6 |
| | | | 1. Brick pavers set in aggregate setting bed | 7 |
| | | | 2. Concrete pavers set in aggregate setting bed | 8 |
| | | | 3. Brick pavers set in bituminous setting bed | 9 |
| | | | 4. Asphalt block pavers set in bituminous setting bed | 10 |
| | | | 5. Brick pavers set in mortar setting bed | 11 |
| | | | 6. Rough stone pavers set in mortar setting bed | 12 |
| | | | 7. Edge restraints for unit pavers | 13 |
| | 1.3 | Submittals | | 14 |
| | | B. Product data for the following: | | 15 |
| 1. | | | Brick pavers | 16 |
| 2. | | | Concrete pavers | 17 |
| 3. | | | Asphalt pavers | 18 |
| 4. | | | Stone pavers | 19 |
| 5. | | | Bituminous setting materials | 20 |
| | | ... | | |
| | 1.4 | Quality Assurance | | 30 |
| | | ... | | |
| | 1.5 | Delivery, Storage, and Handling | | 46 |
| | | ... | | |
| | 1.6 | Project Condition | | 51 |
| | | ... | | |

FIG. 4C

| ONLINE CHECKLIST |
|---|
| ☐ - 01410 Inspection and Testing Requirements<br>      ☐ - This section required for projects in Massachusetts with structural work<br>      ☐ - Testing agency paid for by Owner<br>      ☐ - Testing agency paid for by Contractor |
| ☐ - 01630 Substitution Request Form (always use this section) |
| DIVISION 2 – SITE WORK |
| ☐ - 02050 Demolition<br>      ☐ - Demolition of entire building<br>      ☐ - Selective demolition at portions of exterior<br>      ☐ - Selective demolition at portions of interior<br>                          List:     ▲<br>      ☐ - Items to be salvaged or reinstalled: _____ ▼<br>      ☐ - Asbestos and lead removed under prior contract |
| ☐ - 02100 Site Preparation |
| ☐ - 02140 Dewatering |
| ☐ - 02160 Excavation Support System |
| ☐ - 02200 Earthwork<br>      ☐ - Excavation and compaction at site<br>      ☐ - Excavation and compaction under building |
| ☐ - 02270 Slope Protection and Erosion Control |
| ☐ - 02282 Termite Control |
| ☐ - 02360 Driven Piles |
| ☐ - 02380 Caissons |
| ☐ - 02511 Hot-Mixed Asphalt Paving<br>    ☐ - Roadways<br>    ☐ - Sidewalks<br>    ☐ - Parking Areas<br>    ☐ - Driveways<br>    ☐ - Curbs and Gutters |
| ☐ - 02515 Unit Pavers<br>    ☐ - Brick<br>    ☐ - Concrete<br>    ☐ - Pavers on concrete slab<br>    ☐ - Pavers on bituminous setting bed |

FIG. 7

METHOD OF AUTOMATICALLY GENERATING SPECIFICATIONS AND PROVIDING ONLINE SERVICES FOR SAME

BACKGROUND INFORMATION

1. Field of the Invention

The invention relates to field of specification writing. More particularly, the invention relates to a method of automatically generating a technical specification based on information for a construction project. More particularly yet, the invention relates to such a method that automatically generates specifications from information on drawings and provides specification- writing services.

2. Description of the Prior Art

A set of architectural drawings for a construction project contains not only information pertaining to the dimensions and layout of a building and/or site, but also information on the various elements and materials called for in the project. Brief references to these elements and materials are included in so-called "calloffs" on the drawing. Examples of such "calloffs" are roof windows, aluminum windows, brick siding, brick pavers on sand, etc., as can be seen in FIG. 1A. Information relating to the materials to be used, installation and/or inspection procedures, etc. for these calloffs are then specified in detail in the project specification, a separate document. Generally, this information is taken from a standard specification library that includes the specifications for all products or elements admissible for use in a project constructed according to certain industry standards. Thus, for example, the American Institute of Architects (AIA) has a library of construction specifications, as do the Construction Science Research Foundation and numerous commercial, private, and government organizations.

In the conventional specification-writing process, a specification writer goes through the drawings, notes each calloff on the drawings, and then compiles a complete project specification by gathering and editing the specifications from the specification library for all calloffs in the drawings. Understandably, generating the complete project specification for a construction project can be a very time-consuming process. Literally hundreds of individual products or elements may be called for in a project, resulting in a compilation of hundreds of individual specifications. Each specification for a particular element will include the specifications for the various types of the particular element. For example, the specification for unit pavers will include the specifications for all types of unit pavers, such as brick, stone, asphalt, and concrete, including the type of substrate used with the pavers, if applicable. The specification writer, when writing the project specification, will then painstakingly cross out or delete the many paragraphs that refer to elements other than the particular type of paver called for in the drawing. If the calloff is brick paving, the paragraphs relevant to asphalt, stone and concrete pavers will be deleted.

Over the years, efforts at automating the specification process have been undertaken, but have generally met with little success because they typically require that all users of the automated process restrict the terms used in the calloffs to the terms in an approved glossary. This restriction has proven to be difficult for the industry to accept.

Nevertheless, the recent advances in electronic data management technology and telecommunications have provided many tools that can be used to streamline and simplify the standardization process. For example, many commercial, industrial, and government organizations or groups, including the AIA and the U.S. government have compiled their respective library of specifications into standardized base documents in word-processable formats which are downloadable via the Internet or other means. Furthermore, most drawings for construction projects are generated today with the use of a computer-aided drawing (CAD) software. One of the advantages provided by the CAD software is that the calloffs on the drawing are electronically readable. It would be a great advantage to architects, general contractors, and other entities in the construction industry to be able to automatically generate a project specification by taking the calloff data directly from the CAD drawing and linking that data with the relevant electronic base document to generate a project specification that contains the relevant specifications for the particular project and does not contain extraneous information.

It is also the case that construction projects are often very complex projects, with many firms participating in the planning and construction phases. It would be a great advantage to such firms if the project specification could be generated online in a collaborative process, wherein the project specification would be available online for viewing and editing and the many participating firms could provide information that would then also be immediately available online to all project participants.

Prior art discloses software that scans a CAD drawing, retrieves information from the drawing, and puts it in spreadsheet form. EXCELLINK offered by CAD Studio is such software.

Another firm, BSD SpecLink, provides stand-alone software that allows a client to fill out a checklist and generate a specification based on a BSD specification. Despite the recent technological advances, it has not yet been possible to automatically generate a project specification and have it immediately available online for project participants. It has also not been possible to automatically generate a project specification from calloffs on a CAD drawing, nor has it been possible for a client or user at a remote location to amend or supplement a project specification online during an editing phase.

What is needed, therefore, is a method of automatically generating a specification for the various elements or products required in a construction project and providing users at one or more remote locations with immediate online access to the project specification. What is further needed is such a method that will allow the automatically-generated specification to be viewed and edited online, in real-time, in a collaborative process. What is yet further needed is such a method that automatically generates a project specification from calloffs on a CAD drawing or from an online checklist.

SUMMARY OF THE INVENTION

For the above-cited reasons, it is an object of the present invention to provide a method of automatically generating specifications for construction projects. It is a further object of the invention to provide such a method according to which the information for a construction project can be automatically scanned from a CAD-drawing. It is a yet further object to provide such a method that will allow a collaborative online process between participating parties in generating, viewing and editing the project specification.

These objects are achieved by providing a method of converting construction project information to user tags in a database, mapping the user tags to relevant paragraphs of a base document and merging the user tags and mapping information with the base document to automatically generate an editable project specification. The method according to the invention uses Simple Query Language (SQL) to interface with a relational database management system for organizing the construction project information and mapping it to base documents or master documents that are stored in a document management database. The relational database is specific to the particular base document and basically contains data that allows the information called for in a construction project to be mapped to specific paragraphs in the base document. When the relational database and the base document are merged, only those paragraphs relevant to the specific project are turned on, that is, all irrelevant paragraphs are crossed out. For reasons of efficiency, the relational database is organized as a plurality of tables that can be joined or linked with one another to provide the relevant information for a specific project, a specific client, etc. It is, of course, possible to organize the data in other configurations, such as in one large table, or in many smaller tables. Thus, although reference will be made to various tables in the following description of the invention, it is not necessary that the database be so organized as shown in the illustrations.

The method of automatically generating a project specification from a base document includes a number of preparatory steps, the two major steps of which are creating a glossary of "system default tags" for that base document and mapping the system default tags to the particular sections and paragraphs in the particular base document. In the method according to the invention, "system default tags" are the terms used in the base document. Each term for a product or element, for example, is defined as a system default tag and assigned a "TAG-ID", and also a "PARENT-ID" which provides a parent/child link between paragraphs and sub-paragraphs. The mapping function counts the paragraphs in each section in the base documents and assigns a sequential number to each paragraph in a particular section. This paragraph number is used to link each paragraph to the particular section and paragraph in the base document. Once the system default tags have been defined and the base document mapped, "user tags", i.e., those terms that a client uses, can be associated with the system default tags and thereby mapped to the relevant section, paragraphs and sub-paragraphs.

In the Preferred Embodiment of the method according to the invention, the calloff data from a CAD drawing is loaded into the relational database table and also into a conventional CAD viewer for simultaneously viewing on a computer monitor. The calloffs on the drawing are presented as they appear on the drawing and also in a calloff list on the screen. The link to the calloff list, referred to hereinafter as a calloff-link, is based on an algorithm that converts the X/Y world coordinates of items in the CAD drawing to the pixel coordinates of the computer screen. Thus, as the viewer pans or zooms in on a portion of the CAD drawing, only those calloffs that are included within the area shown on the viewer are presented in the calloff list. The drawing mapping function then searches a dictionary to determine if the calloff is a "known" or "previously scanned" calloff, that is, either corresponds to a system default tag or has been associated with one. If the calloff is found in the dictionary, it is identified as a known tag. If the calloff is not found, the drawing mapping function next searches an ignore bin to see if the calloff has been identified as one to be ignored in project specifications. If this is the case, the calloff is identified in the calloff list as an ignore tag. Calloffs that are not found in the dictionary or ignore bin are identified as unscanned calloffs. The specification writer can now decide whether the calloff is to be ignored, or is relevant to the project specification. If relevant, the specification writer goes through a process of searching the base documents with a full-text search to determine if the particular unscanned calloff or a term similar to it appears in the document and in which sections. If the calloff is found, the specification writer works through a decision process to determine whether the calloff is found in an appropriate section and paragraph, and if it is, it is associated with the system default tag in that section and paragraph. If the calloff is not found, the specification writer must then determine what the appropriate system default tag is, enter the calloff as a user tag in the relational database, and associate it with the appropriate system default tag. In this process, the specification writer has an opportunity to determine that the user tag be associated with the system default tag for this particular project only, for this particular client only, or for general use.

When all calloffs on the CAD drawing have been converted to user tags or defined as ignore tags, the project specification is automatically generated by merging the relational database with base documents or default master documents stored in the document management database. The relational database selects all the user tags that are defined specifically for the project or are tags that are applied to all project specifications. The user tags are then mapped to the relevant paragraphs of the base document and, when the base document is merged with the relational database and sent to the document editor, all paragraphs that are irrelevant, i.e., that were not mapped, appear as crossed-out paragraphs. This process of "turning on" relevant paragraphs and "turning off" irrelevant paragraphs can be done in a number of ways. For example, whether base documents is stored with all paragraphs initially crossed-out and with the relevant paragraphs "turned on" when the base document is merged with the relational database, or the document is stored with all paragraphs "on", and, when merged with the relational database, the irrelevant paragraphs are turned off, will depend on which process is more efficient.

After the specification is sent to the editor, it can be accessed from remote locations via the Internet by all participants of the construction project who have access to the particular client account. The participant can communicate with the specification writer and with other participating parties by including notes or remarks in a project notes database provided within the client account.

In an alternative embodiment of the invention, the drawing itself is not scanned into a file, but rather construction project information is entered into a checklist that is provided online. The process of associating user tags with system default tags is eliminated in this embodiment, as the checklist provides the tags used in the project specification and the client selects the applicable tag. The client can decide to associate the particular checklist item with the current project only or to bind it for all future projects of the particular client, for example, for paragraphs that appear typically in all project specifications. The steps of generating the client project specification by merging the relational database, which now uses the user tags defined in the checklist, with the base document and providing the specification online for viewing and/or editing are the same as described with the first embodiment.

The specification-writing services according to the method of the present invention are provided to the client in a number of ways. In all embodiments, the client is provided with a secure online client account, can view the automatically-generated project specification online, and can interact in real-time with the specification writer and other participants of the construction project who have access to the client account online, i.e., as soon as the specification is amended and "saved", it is viewable by all participants online. In a further development of the Preferred Embodiment, the client contracts for access to the relational database, receives the necessary Internet browser plug-ins for the specification editor and generates his or her own project specification. The client may use the checklist to generate the relevant user tags or may have access to the calloff link and CAD viewer, scan the drawing for the calloffs, and generate the editable project specification. In both of these cases, the service is offered as a type of do-it-yourself service and the client in effect becomes the specification writer.

BRIEF DESCRIPTION OF THE DRAWINGS

FIG. 2 is a breakdown of the divisions of a standard base document, showing a few of the sections for the various divisions (prior art).

FIG. 4A is a diagram showing system tags with a tag ID and a parent ID.

FIG. 4B is a diagram showing the mapping of a tag to a section and a paragraph of the base document.

FIG. 4C lists the first few paragraphs in Section 02780—*Unit Pavers* and shows the paragraph ID assigned to each paragraph.

FIG. 7 shows a checklist provided in an online checklist service.

DETAILED DESCRIPTION OF THE INVENTION

Figures 1A, 1B:
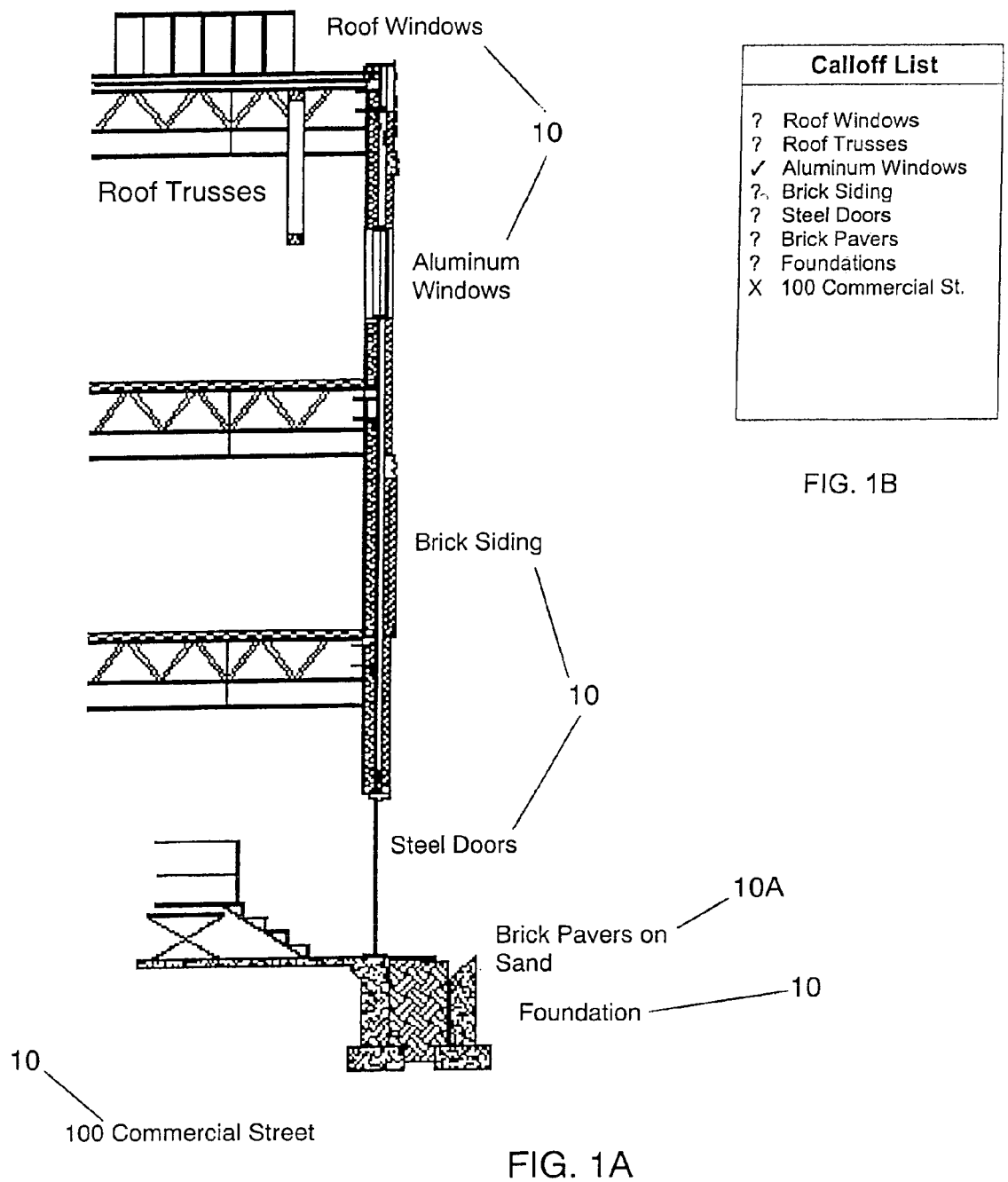
FIG. 1A depicts a section of a construction drawing showing some of the calloffs on the drawing (prior art).
FIG. 1B shows a calloff list according to the invention.

The present invention provides a method of automatically generating a project specification PS1 online, based on a base document B, and providing a client with online, real-time access to the project specification PS1. The base document B is a complete, unedited specification that contains all specifications for any element or product that is generally approved for use in construction. In the description that follows, the base document B referred to is a standard specification, although it should be understood that this document can be a document that has been generated previously for the same or for another client and is now used as a default client master document CMaster. The divisions and some of the sections and paragraphs of the base document B are shown in FIG. 2 to illustrate the structure of the document and to serve as an aid in describing the method according to the present invention.

The standard base document B is stored in a base document database DB0, which, in the Preferred Embodiment is a LOTUS NOTES® database. A client database DB1 is a document database file that contains the current client project of a Client C1. This client database DB1 may also contain the client master document CMaster and/or one or more client documents previously generated for other projects for the client that may be used as default documents for subsequent projects. Additional client database files DB2, DB3, . . . are provided for additional Clients C2, C3, . . . . The client database DB1 is accessible to the Client C1 online from a remote location via the Internet.

As can be seen in FIG. 2, the base document B consists of 16 divisions 01 . . . 16, with each division having a number of sections identified by a five-digit code, such as *Section* 02780—*Unit Pavers*. Only a few sections are shown in FIG. 2 for each division, as an illustration of the structure of the standard base document B. Since the example used throughout this description will be taken from the Section 02780—Unit Pavers, this section is shown in greater detail.

The heart of the method lies in a relational database SQL-DB that contains data that maps a user tag UT to a system default tag ST and then to the relevant paragraphs in the base document B. Before a project specification can be automatically generated, a dictionary of "system default tags" is created. Each section has a section code SECTION-ID and, in the example used herein, the SECTION-ID for Unit Pavers is 02780. Each paragraph of the base document B is reviewed and one or more system default tags ST are associated with each particular section and paragraph that is project relevant. Several examples of system default tags ST are shown in a System Tags Table T2 in FIG. 4A. Some paragraphs in the base document B are general paragraphs that are required for all project specifications and are identified as to be included in all project specifications and may or may not require a system default tag. The system default tag ST is associated with the particular section and paragraph by assigning a unique system tag identifier TAG-ID to each system default tag ST. The System Tags Table T2 shown in FIG. 4A lists several system default tags ST, each with a unique system tag identifier TAG-ID. The method according to the invention also defines a parent/child relationship for each system default tag ST. For example, as can be seen by reviewing the breakdown of SECTION 02780—Unit Pavers in FIG. 2 and System Tags Table T2 in FIG. 4A, Unit Pavers has a TAG-ID of 221 and a PARENT-ID of 0. Brick pavers has a TAG-ID of 553 and a PARENT-ID of 221, indicating that system default tag Unit Pavers 221 is a parent to system default tag Brick pavers 553.

The system tag identifiers TAG-ID are "mapped" to the particular sections of the base document B. FIG. 4C shows a mapping example of the first few paragraphs of SECTION 02780—Unit Pavers in which the paragraphs are assigned a PARAGRAPH-ID. As can be seen in FIG. 4C, Division 02, the section 02780 starts with PARAGRAPH-ID of 1, and all paragraphs within that section are numbered sequentially. FIG. 4B shows a portion of a Mappings Table T3 that illustrates the relationship between the PARAGRAPH-ID, the SECTION-ID, the TAG-ID, and a mapping identifier MAP-ID. The mapping function of the SQL-DB will be discussed below when describing the process of generating a project specification.

In the Preferred Embodiment of the method, the project specification PS1 for Client C1 is automatically generated from calloffs on a CAD drawing. FIG. 1A shows a section of a construction drawing A containing several typical calloffs 10 for building and site elements required in a construction project. In this embodiment the drawing A is a CAD drawing from Client C1 that is loaded into a CAD interface means, such as a conventional CAD viewer, such as AUTODESK VOLOVIEW and scanned for calloffs and other elements on the CAD drawing that can include text, keynotes, embedded objects, and symbols. The CAD viewer interfaces with a calloff link that is based on an algorithm which takes the real world X/Y coordinates from the CAD system and converts them to the pixel coordinate system of a computer monitor. As the viewer pans across or zooms in on portions of the CAD drawing, the calloffs and other elements on the portion of the drawing that appears in the viewer are presented in a popup dialog box Calloff List CL, shown in FIG. 1B. The calloff link knows the location of the viewer on the drawing and can match the location of the particular calloff shown on the screen with the CAD X/Y coordinates of the drawing.

Figure 3:
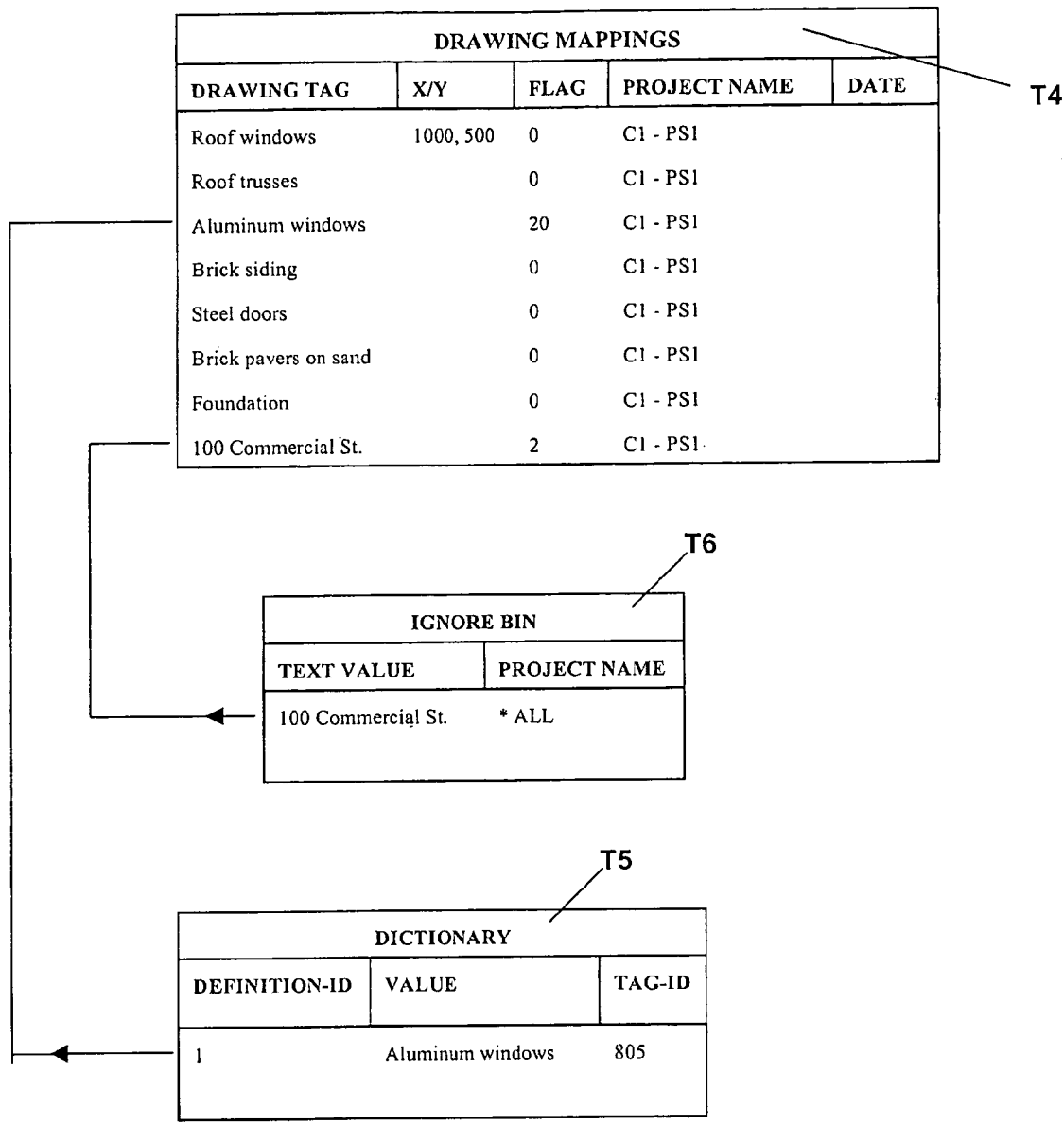
FIG. 3 is a diagram showing a drawing mappings table, a dictionary table and an ignore bin.

The example of the calloff 10A, brick pavers on sand, shown in FIG. 1A, will be used to illustrate the method. As can be seen in FIG. 2, the calloff brick pavers on send 10A does not appear in precisely that form in Section 02780 B Unit Pavers, which includes such pavers as brick pavers, concrete pavers, asphalt pavers, and stone pavers. The Calloff List CL in FIG. 1B shows the calloffs that appear on the screen when the viewer displays the section of the drawing A shown in FIG. 1A. Data from calloffs that have been previously scanned and incorporated into the SQL-DB are shown in FIG. 3. For example, aluminum windows with a TAG-ID of 805 is shown in a Dictionary T5, and 100 Commercial Street is shown in an Ignore Bin T6, with project name All, indicating that this particular calloff is to be ignored on all projects when generating specifications. FIG. 3 also shows a Drawings Mappings Table T4 which lists, among other information, the calloffs in the drawing, the X/Y coordinates of the calloff, a Flag F, and a Project Name. When a calloff appears in the Calloff List CL, the drawing mappings function of the SQL-DB checks in the Dictionary T5 to see if the calloff is already there and, if it is, inserts a value for the Flag F that identifies the calloff as a scanned tag. If the calloff is not found in the Dictionary T5, the mappings function checks an Ignore Bin T6 to see if the calloff is listed as a user tag to be ignored and, if it is, inserts a value for the Flag F in the Drawing Mappings Table T4 that identifies the calloff as an ignore tag. If the calloff is not found in either of these tables, the drawing mappings function inserts a value for the Flag F that indicates that the calloff is an unscanned tag. Looking now at the Calloff List CL shown in FIG. 1B, the calloff for aluminum windows is identified as a known or scanned tag with a SCANNED icon, and 100 Commercial Street is identified as an ignore tag with an IGNORE icon. The rest of the calloffs, including brick paver on sand are marked as unknown or unscanned tags with an UNSCANNED icon. The icons serve as visual cues as to the status of the respective calloffs and can be color-coded to effectively signal a scanned, unscanned, or ignore status.

Figure 5:
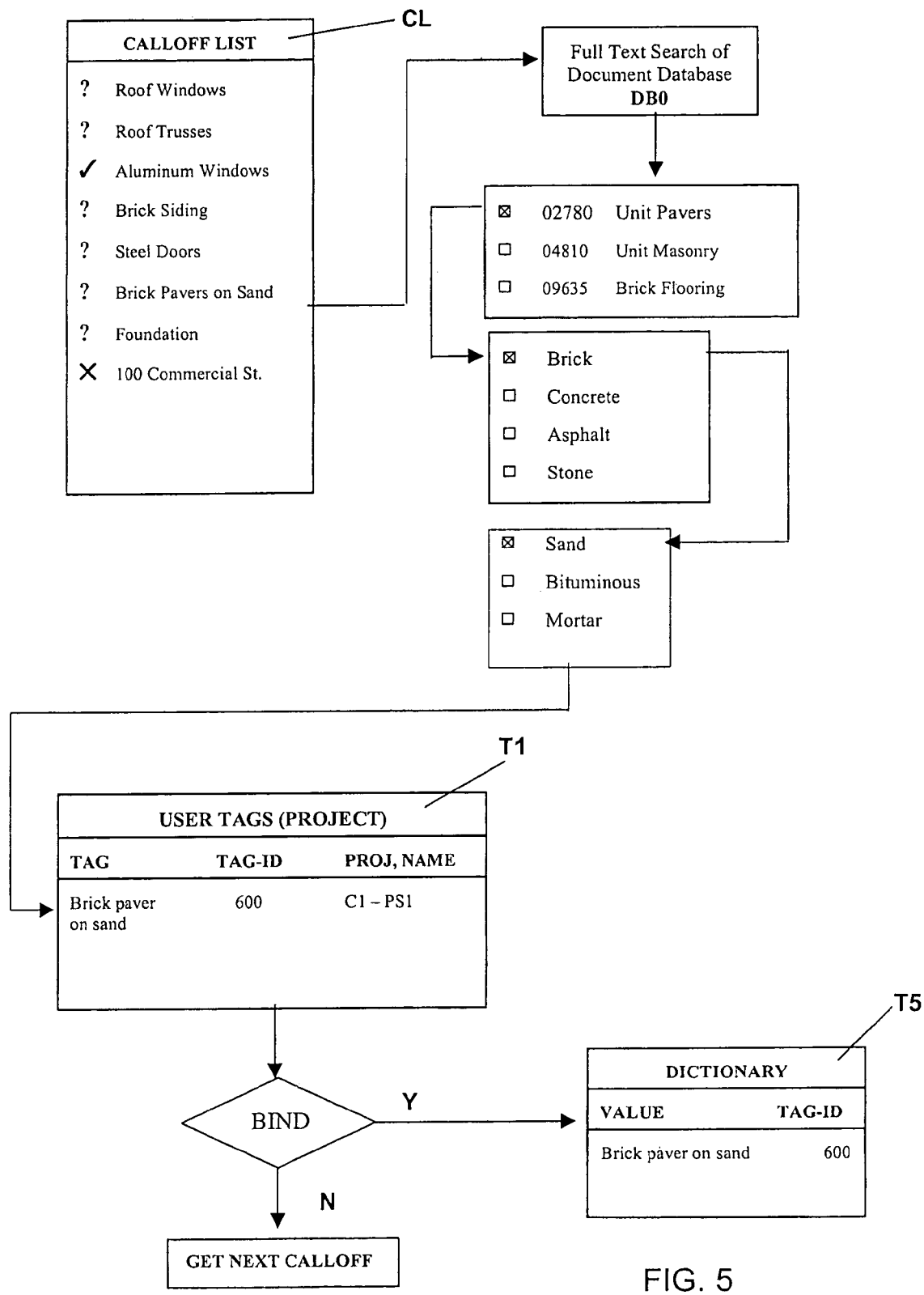
FIG. 5 shows the decision tree when associating a user tag with system default tags and binding the user tag in a dictionary for future application.

FIG. 5 illustrates the process of associating the user tag brick pavers on sand with the system default tag for sand. A full-text search of the base documents in the document management database is carried out, using, for example, the term brick pavers. The SECTION-IDs and corresponding section names in which brick pavers occurs now appear listed on the screen in a dialog box. The specification writer, knowing from the context of the drawing that the calloff brick pavers on sand pertains to Unit Pavers, and not to Unit Masonry, or Brick Flooring, selects 02780 Unit Pavers. Unit Pavers is then further broken down into brick, concrete, asphalt, stone. Brick is further broken down into substrates such as sand, bituminous, mortar. By selecting the system default tag sand, the calloff brick pavers on sand is stored in the User Tags Table T1 as the user tag brick pavers on sand with the TAG-ID 600 that corresponds to sand aggregate in SECTION 02780. The person scanning the drawing now has the opportunity to "bind" the user tag brick pavers on sand with the system default tag sand with TAG-ID 600, i.e., to associate the user tag with the system default tag TAG-II) 600 for all project specifications in the future, or to associate the user tag for this project specification only, or for this client only. The user tag is identified accordingly in the Dictionary T5 and will be recognized in future scans as a known user tag. The Dictionary T5 contains all tags or abbreviations, including system default tags ST and user tags that have been associated with a system default tag ST. These tags can be coded for general use or for a particular client or project. For example, tags that are generally applicable for all clients can be assigned a general code such as 0, and tags used by the individual clients can be assigned unique client ID codes.

As time goes on and Client C1 continues to submit drawings for subsequent projects, the number of "unscanned" or "unknown" user tags appearing in the Calloff List CL will decrease and less and less effort will be required on the part of the specification writer to associate user tags with system default tags ST.

Figure 6:
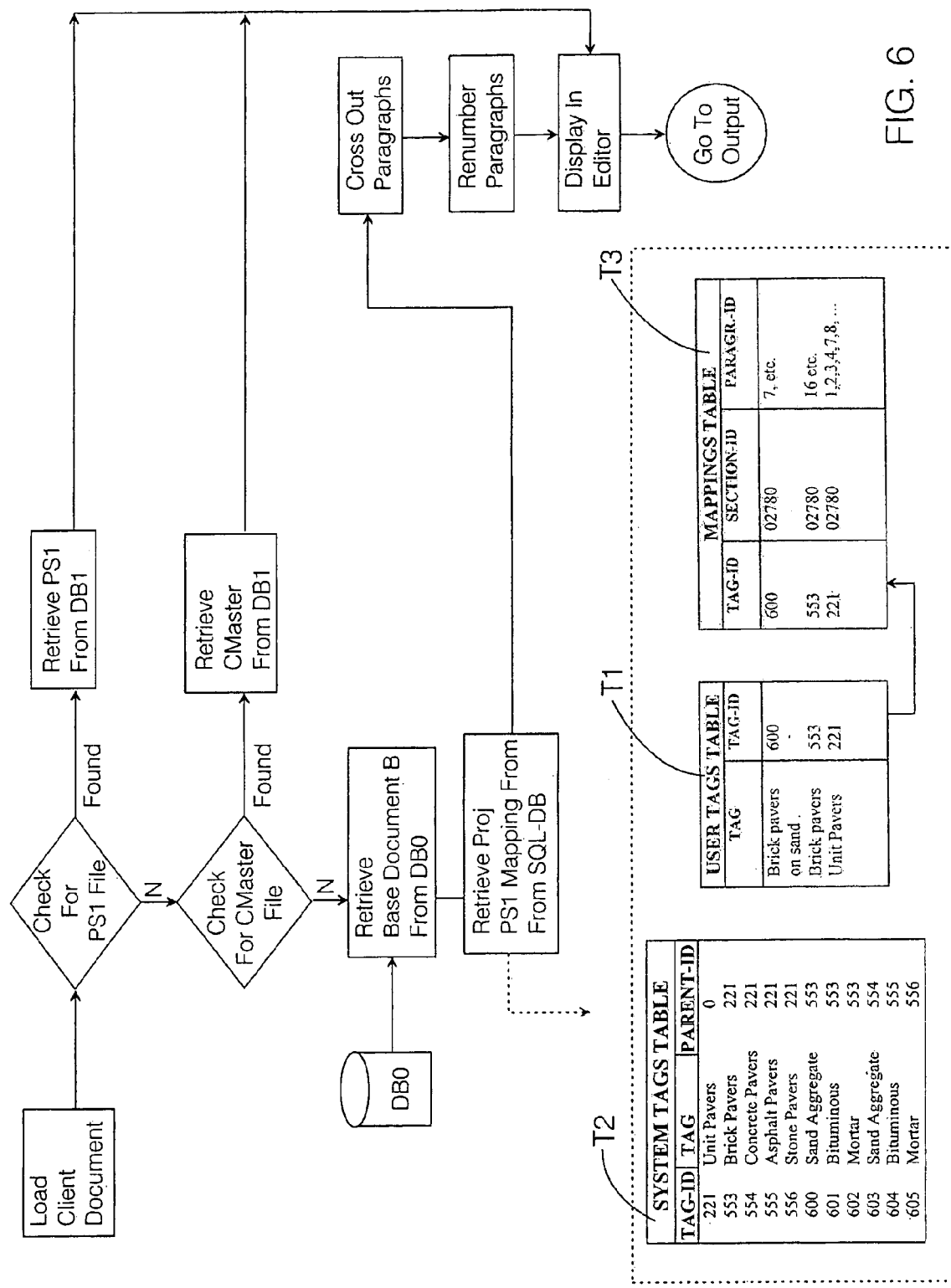
FIG. 6 illustrates the process of merging the relational database with the base document database and the process of mapping the user tag to the relevant sections and paragraphs.

When the steps of associating all the user tags have been completed, the user tag data for the particular project can be linked with the Mappings Table T3 and the Sections Table T0 to map the relevant paragraphs of the base documents required for this project specification PS1. Continuing with our example of brick pavers on sand, this user tag was associated with sand in SECTION 02780 with sand aggregate TAG-ID 600, which is placed in the User Tags Table T1 and identified as relevant to project specification PS1. It can be seen in the System Tags Table T2 in FIG. 4A, that sand aggregate TAG-ID 600 has a parent brick pavers with TAG-ID of 533 which is also placed in the User Tags Table T1 and identified as relevant to project specification PS1. Looking again in the System Tags Table T2, it can be seen that TAG-ID 533 has a parent Unit Pavers with TAG-ID 221. Unit Pavers is also placed in the User Tags Table T1 with the appropriate association with PS1. Unit Pavers has a PARENT-ID of 0, shown in FIG. 4A, which indicates that it has no parent. Thus, a complete map of the sections and paragraphs required for the project specification PS1 is generated in the SQL-DB for the user tag brick pavers on sand by inserting the lowest level association of a user tag into the User Tags Table T1 and extracting parent paragraph information from the Systems Tag Table T0. As can be seen in the Mappings Table T3 in FIG. 6, each TAG-ID has associated with it the SECTION-ID and the relevant PARAGRAPH-ID.

The SQL-DB and the base document B are then merged to generate the project specification PS1. As shown schematically in FIG. 6, the complete base document B is pulled up from the document management database DB0 and merged with the SQL-DB. The User Tags Table T1 defines the user tags that are required for the particular project specification PS1 and extracts the relevant sections information from the Sections Table T0. The mappings function in the SQL-DB determines which paragraphs in the base document B are irrelevant, based on the information in the User Tags Table T1 and are to be crossed out when the project specification PS1 is sent to the editor. In the Preferred Embodiment, the newly generated project specification PS1, as it appears online for editing and viewing, shows all the paragraphs of the base document B, whereby those paragraphs that are irrelevant to the particular project are crossed-out.

Once the newly generated project specification PS1 is saved, it is immediately viewable and editable online. Client C1, including all participants in the construction project who have access to the client account, can now review the project specification PS1 and incorporate comments or requests for changes to the specification in a related project notes database file that is provided in the Client Account.

In an alternative embodiment, a Checklist, shown in FIG. 7, is provided online for the client to fill out. The Checklist is organized commensurate with the divisions and sections contained in the particular base document and contains a list of tags in each section that can be checked off. A unique field note is associated with each check box that relates the box to a particular system default tag ST. In this alternative embodiment, the Checklist is not a relational database, but is simply a static table. A look-up procedure links the checked field notes in the checklist with the respective tags in the System Tags Table T2. Information from the System Tags Table T2 is linked to the User Tags Table T1 and the procedure for generating the project specification PS1 is analogous to that of the Preferred Embodiment as of the point when the user tags for the particular project have been inserted into the User Tags Table T1.

Common to both embodiments is that the project specification PS1 is available for viewing online via the Internet to project participants located at remote sites via a client account. In a further development of the Preferred Embodiment, Client C1, after opening an account with the specification writing service, receives access to the specification database SQL-DB, the base documents, the CAD scanning functions, and the editor and can generate his or her own project specification and edit it online. When the project specification is ready for printing, it is downloaded to a file in the client's computer in standard wordprocessor formats such as MS Word®, WordPerfect®, rich text format, etc. Client C1 can continue to modify the project specification by wordprocessor, if so desired.

The embodiments mentioned herein are merely illustrative of the present invention. It should be understood that variations in construction and installation of the present invention may be contemplated in view of the following claims without straying from the intended scope and field of the invention herein disclosed.

What is claimed is:

1. A method of automatically producing a project specification from project information, said method comprising the steps of:
   a) providing a base document that contains base project information, said base document having subdivisions, sections, and/or paragraphs;
   b) providing a base document database that associates a paragraph identifier with each one of said subdivisions, sections, and/or paragraphs;
   c) creating a system tag database that contains a system tag with a tag identifier;
   d) providing a system mapping means that maps each system tag to at least one said paragraph identifier;
   e) identifying a child-parent relationship between said system tag and a parent system tag and associating with said system tag in said system mapping means each said paragraph identifier to which said parent tag is mapped;
   f) creating a project-specific user tag database that includes a user tag;
   g) providing a project specification interface means that interfaces with said system tag database and associates at least one said system tag with said user tag in said project-specific user tag database;
   h) automatically generating a project specification by interfacing said project-specific user-tag database with said system mapping means to acquire each said paragraph identifier for each said system tag that is associated with each said user tag, including each said paragraph identifier of each said parent system tag, and then creating said project specification from said base document, said project specification then including a corresponding subdivision, section and/or paragraph of said each said paragraph identifier associated with each said user tag.

2. The method of claim 1, wherein creating said project specification from said base document includes presenting said base document with all of its subdivisions, sections, and paragraphs, with said corresponding subdivision, section, and paragraph that are associated with said system tag presented as included in said project specification, and all others of said subdivisions, sections, and/or paragraphs of said base document presented as undesired text.

3. The method of claim 1 further comprising the steps of:
   i) automatically extracting a CAD calloff from a CAD drawing with a CAD interface means; and;
   j) identifying said CAD calloff as said user tag.

4. The method of claim 3, said step of automatically extracting a CAD calloff from said CAD drawing including the steps of
   i1) scanning said CAD drawing with said CAD interface means, which automatically identifies said CAD calloff and provides said CAD calloff to said project specification interface means.

5. The method of claim 3, said step of identifying said CAD calloff as a user tag including the step of:
   j1) identifying a corresponding system tag in said system tag database that corresponds to said CAD calloff.

6. The method of claim 5, said step of identifying said CAD calloff as a user tag including the step of:
   j2) identifying said CAD calloff as a needed user tag and placing said needed user tag in said project-specific user tag database as said user tag.

7. The method of claim 6, said step of identifying said CAD calloff as a user tag including the step of:
   j3) identifying said CAD calloff as an unscanned tag.

8. The method of claim 7, further including said step of;
   j4) searching said system tag database for a corresponding one of said system tag that corresponds to said unscanned tag;
   j5) associating said tag identifier of said corresponding one of said system tag with said unscanned tag; and
   j6) identifying said unscanned tag as said user tag.

9. The method of claim 3, said step of identifying said CAD calloff as a user tag including the step of:
   j7) identifying said CAD calloff as an ignorable tag and placing said ignorable tag in an ignore-tag database.

10. The method of claim 3, wherein said CAD interface is a CAD viewer.

11. The method of claim 3, said step of identifying said CAD calloff as a user tag further including the steps of:
    j8) providing a dictionary containing dictionary tags, each dictionary tag in said dictionary having an association with one said system tag;
    j9) searching said dictionary for a corresponding one said system tag that corresponds to said CAD calloff; and
    j10) associating said tag identifier of said one said system tag with said CAD calloff and identifying said CAD calloff as said user tag.

12. The method of claim 11, further including the step of:
    j11) including said user tag in said dictionary and binding said tag identifier to said user tag.

13. The method of claim 1, further comprising the step of:
k) providing a checklist of items;
l) identifying at least one of said items in said checklist as said user tag and including said user tag in said project-specific tag database.

14. The method of claim 13, said step of providing said checklist includes the step of:
k1) making said checklist online available online.

15. The method of claim 14, said step of providing said checklist online including the steps of:

k2) providing a specific online client account for each client k3) providing said client with access to a document editor and to said project specification for reviewing and editing said project specification; and k4) allowing said client to work collaboratively on said project specification, wherein said client may include one or more persons located at one or more remote sites.

* * * * *